(12) United States Patent
Hutt et al.

(10) Patent No.: US 6,730,337 B2
(45) Date of Patent: May 4, 2004

(54) ISOTONIC JUICE DRINK FOR CHILDREN

(75) Inventors: Libby Hutt, Newport Beach, CA (US); John Verstrate, Marysville, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/038,542

(22) Filed: Jan. 3, 2002

(65) Prior Publication Data

US 2002/0132034 A1 Sep. 19, 2002

Related U.S. Application Data

(63) Continuation of application No. PCT/EP00/06363, filed on Jul. 5, 2000.
(60) Provisional application No. 60/142,376, filed on Jul. 6, 1999.

(51) Int. Cl.[7] .............................. A23L 1/22; A23L 1/20
(52) U.S. Cl. .................... 426/74; 426/590; 426/599; 426/801
(58) Field of Search ................... 426/74, 590, 599, 426/801

(56) References Cited

U.S. PATENT DOCUMENTS

| 5,032,411 A | | 7/1991 | Stray-Gundersen ......... 426/74 |
| 5,114,723 A | | 5/1992 | Stray-Gundersen ......... 426/74 |
| 5,480,674 A | * | 1/1996 | Peterson .................... 426/534 |
| 5,968,544 A | | 10/1999 | Howard et al. ............. 424/439 |
| 6,051,261 A | * | 4/2000 | Bartholmey et al. ......... 426/72 |
| 6,455,511 B1 | * | 9/2002 | Kampinga et al. ......... 426/648 |

FOREIGN PATENT DOCUMENTS

| CA | 896486 | 3/1972 |
| EP | 0 587 972 A1 | 3/1994 |
| WO | WO 97/45026 | 12/1997 |

* cited by examiner

*Primary Examiner*—Helen Pratt
(74) *Attorney, Agent, or Firm*—Winston & Strawn LLP

(57) ABSTRACT

An isotonic drink that is especially designed for children between the ages of 6 and 12 years. The drink contains water, carbohydrates including fruit juice, a calcium source and vitamin C. The drink has an osmolality of about 300 to about 380 mOsm/kg and a pH of between about 3 and about 4.5. The drink improves hydration compliance when consumed by children.

6 Claims, No Drawings

ISOTONIC JUICE DRINK FOR CHILDREN

CROSS-REFERENCE TO RELATED APPLICATIONS

This application is a continuation of the U.S. national stage designation of International application PCT/EP00/06363 filed Jul. 5, 2000, which claims the benefit of Provisional application Ser. No. 60/142,346, filed Jul. 6, 1999, the content of which is expressly incorporated herein by reference thereto.

FIELD OF THE INVENTION

This invention relates to an isotonic, fruit juice based drink which is intended for children in the 6 to 12 year old age category. The invention also relates to a method for providing fluid to children in the 6 to 12 year old age category and for improving hydration compliance.

BACKGROUND TO THE INVENTION

It is well known that the combination of exercise and exposure to sunlight and heat can result in dehydration and heat related conditions such as heat syncope, heat exhaustion, dehydration syndrome, and heat stroke. Children are particularly prone to dehydration related problems because they are generally very active; often in conditions of raised temperatures and sunlight. Also, children drink when they are thirsty and not to prevent dehydration. However, by the time a child is thirsty, the child is already in the initial stages of dehydration. Thirst is not a good indicator of whether or not a child should drink.

If the exposure to heat is accompanied by exercise, a marked increase in glucose utilization takes place. Some of the glucose needed for energy comes from liver glycogen stores. With prolonged exercise, liver glycogen stores are depleted and the rate of glucose production fails to keep pace with glucose utilization, resulting in a fall in the blood glucose concentration. Several physiological responses may then occur; such as increased body temperature, perspiration and pulse rate, decreased blood volume, and biochemical changes associated with the metabolism of compounds to produce energy.

Some of these adverse effects may be avoided by consuming water; especially maintaining body temperature and blood volume. However, it is better to consume fluids which contain saccharides, electrolytes and water. Many products which contain saccharides, electrode and water are commercially available. One well known example of this type of product is GATORADE® which is commercialized by The Quaker Oats Company. The composition of this product is described in British Patent No. 1,252,781.

PCT patent publication WO97/45026 discloses a creatine-containing isotonic beverage that can be fruit flavoured. It does not suggest that actual fruit juice may be included, teaching instead that carbohydrates should be avoided.

Canadian patent No. 896,486 discloses an isotonic drink, again excluding real fruit juice, despite aiming to meet palatability requirements for oral tolerance. Artificial sweetening agents are preferred.

A sports drink is the subject of EP 0 587 972, but is specifically omits reference to vitamin C as a component. This drink has high concentrations of fruit juice, apparently to provide the requisite sweetening power and to balance the pH for acceptable palatability.

Moreover, these products are not designed for children in the 6 to 12 year old age category. Key to preventing dehydration is stimulating people to drink more fluid voluntarily. Most commercially available products use their sodium and glucose content to stimulate people to drink more fluid voluntarily. However, taste is an important stimulant and most commercially available products are not directed to childrens' tastes. Also, children are dependent upon what their parents make available and most commercially available products often are not products which parents would purchase for children. Also, most commercially available products are formulated for the physiological needs of children.

Therefore, there is a need for an isotonic drink which is suitable for as a rehydration beverage children in the 6 to 12 year old age group, and this is satisfied by the present invention.

SUMMARY OF THE INVENTION

Accordingly, in a first aspect this invention provides an isotonic drink for children, the drink comprising: water; electrolytes; a carbohydrate source including at least about 7% by weight of the drink of fruit juice; a calcium source, and vitamin C. Advantageously, the drink has an osmolality of about 300 to about 380 mOsm/kg and a pH of about 3.5 to about 4.2.

This drink offers the advantages that it is based upon fruit juice and therefore attractive to both children and their parents. Children may be stimulated people to drink more fluid voluntarily and parents may be stimulated to make the drink available. Further, the drink contains calcium and vitamin C; both of which are necessary for children. Also, the beverage has an osmolality which is better aligned to the osmotic pressure in children.

Preferably, the carbohydrate source provides less than about 8% by weight of carbohydrate.

In another aspect, this invention provides a method for improving hydration compliance in an active child of 6 to 12 years age, the method comprising providing a sweetened isotonic drink which contains fruit juice, a calcium source, and vitamin C.

DETAILED DESCRIPTION OF THE PREFERRED EMBODIMENTS

The invention provides an isotonic drink which is especially formulated for children. The drink has a taste and image which encourages children to drink but which provides the electrolytes and carbohydrates necessary to keep children hydrated. The drink is based upon water; electrolytes; and a carbohydrate source which includes fruit juice. A calcium source and vitamin C are also included.

The carbohydrate source may be any suitable carbohydrate source; particularly a combination of fruit juice and other saccharides. The fruit juice is preferably in the form of a concentrate and may be of any flavor. For example, the fruit juice may be apple juice concentrate, orange juice concentrate, pear juice concentrate, cranberry juice concentrate and the like. The other saccharides may be any saccharides suitable for inclusion in drinks. Suitable examples include sucrose, glucose, fructose, high fructose corn syrup, and maltodextrin.

The fruit juice is preferably present in an amount that it provides at least about 7% by weight of the drink; more preferably about 8% to about 12% by weight. For example, the fruit juice may provide about 10% by weight of the drink.

The total carbohydrate content of the drink, including that provided by the fruit juice, is preferably less than about 8% by weight. At carbohydrate concentrations more than about 8% by weight, fluid absorption becomes reduced. Preferably, the drink contains about 5% to about 7.5% by weight of carbohydrate.

If the carbohydrate source does not provide sufficient sweetness, artificial sweeteners such as saccharin, cyclamates and aspartame may be added in an amount sufficient to provide a sweet flavor.

The drink contains the electrolytes sodium and potassium. The sodium and potassium may be provided by suitable sodium and potassium salts such as sodium chloride, sodium citrate, and potassium citrate. The drink preferably contains about 60 mg/l to about 250 mg/l of sodium; more preferably about 80 mg/l to about 125 mg/l. For example, the drink may contain about 105 mg/l of sodium. The drink preferably contains about 60 mg/l to about 150 mg/l of potassium; more preferably about 190 mg/l to about 230 mg/l. For example, the drink may contain about 210 mg/l of potassium.

The drink contains a source of dietary calcium. The calcium source may be any suitable food-grade calcium salt of organic and inorganic compounds. The calcium source should be capable of being solubilized such that a clear solution at a pH of about 4.5 and below may be obtained. Calcium sources which adversely affect flavor, calcium absorption or biological functions are to be avoided. Suitable inorganic calcium sources include the oxide, hydroxide, carbonate, and orthophosphate(s) (mono-, di- and tricalcium phosphate). Suitable organic calcium sources include calcium lactate, calcium gluconate, calcium citrate, calcium acetate, calcium ascorbate, calcium tartarate, calcium malate and the like. Calcium lactate is preferred.

The calcium source is preferably present in an amount such that at least about 20% of the recommended daily value for calcium is provided per liter; more preferably about 30% to about 60% of the recommended daily value for calcium. For example, the drink may contain about 40% of the recommended daily value for calcium per liter.

The drink also contains vitamin C. Preferably sufficient vitamin C is provided such that the drink contains at least 300% of the recommended daily value for vitamin C per liter; more preferably about 350% to about 500% of the recommended daily value for vitamin C per liter.

The drink preferably contains an acid to provide a pH in the range of about 3 to about 4.5. Any food grade acid may be utilized to adjust the pH of the drink. For example, citric acid, phosphoric acid, fumaric acid, adipic and malic acid may be used without developing off taste. Hydrochloric acid is less preferred as the chlorine ion can be nutritionally disadvantageous. Preferably, the acid used for acidification is citric acid. The pH is more preferably in the range of about 3.5 to about 4.2; for example about 3.7 to about 3.9.

The drink has an osmolality of about 300 mOsm/kg to about 380 mOsm/kg; more preferably about 340 mOsm/kg to about 370 mOsm/kg. For example, the drink may have an osmolality of about 360 mOsm/kg. Osmolalities in this range are better suited to the needs of children.

The drink may also include other ingredients normally found in soft drinks such as clouding agents, natural or artificial coloring, preservatives and the like. However, preservatives are not necessary and in fact may be undesirable. The provision of the clear drink allows for the controlled clouding and coloring of the drink, can be added as desired. The drinks may also include other vitamins and minerals as desired.

The drink may be manufactured by mixing the calcium source with any other dry ingredients to form a dry mix. Water and the fruit juice may then be added to the dry mix and the ingredients dispersed. After dispersion, the pH is adjusted as desired with acids. Any additional ingredients may then be added as desired. The volume is adjusted to the appropriate level and the drink bottled and pasteurized according to good manufacturing techniques. The drink is preferably bottled in PET containers under hot filling conditions.

EXAMPLE

A drink is prepared from water, high fructose corn syrup, sucrose, apple juice concentrate, maltodextrin, calcium lactate, citric acid, vitamin C, potassium citrate, sodium chloride, flavors and colors. The drink has the following properties:

| | |
|---|---|
| Solids Content | 8.1% by weight |
| Carbohydrate content | 7.4% by weight |
| Calcium content/liter | 42% of RDA |
| Vitamin C content/liter | 420% of RDA |
| pH | 3.7 to 3.9 |
| Osmolality | 359 mOsm/kg |

The drink has a pleasant, sweet, citrus-like taste and is readily consumed by young children.

What is claimed is:

1. A method for improving hydration compliance in comprising providing a child of 6 to 12 years of age with a sweetened isotonic drink which contains fruit juice in an amount of about 8% to 12% of the drink, a calcium source, vitamin C, an osmolality of about 340 to about 380 mOsm/kg, and a pH of about 3 to about 4.5, to improve hydration compliance in the child.

2. The method of claim 1 wherein the drink further comprises water and electrolytes, and a total carbohydrate content of less than about 8% by weight.

3. The method of claim 2 wherein the electrolytes comprises about 60 mg/l to about 250 mg/l of sodium and about 60 mg/l to about 150 mg/l of potassium, and the total carbohydrate content is between about 5 to about 7.5% by weight.

4. The method of claim 1 wherein the calcium source provides at least about 20% of the recommended daily value for calcium per liter.

5. The method of claim 1 wherein the vitamin C is provided in an amount which is equal to about 300% to about 500% of the recommended daily value for vitamin C per liter, and the drink has a pH of between about 3.5 and about 4.2.

6. The method of claim 1, wherein the drink further contains one or more of clouding agents, flavoring agents, natural or artificial coloring, preservatives, additional vitamins or minerals, or mixtures thereof.

* * * * *